United States Patent [19]
De Risi

[11] Patent Number: 6,158,371
[45] Date of Patent: Dec. 12, 2000

[54] HYDRAULIC SYSTEM FOR MANEUVRING BOATS, SHIPS AND CRAFTS IN GENERAL

[76] Inventor: Felice De Risi, via Acherusio 20, 00199 Roma, Italy

[21] Appl. No.: 09/101,159

[22] PCT Filed: Nov. 14, 1997

[86] PCT No.: PCT/IT97/00279

§ 371 Date: Jul. 2, 1998

§ 102(e) Date: Jul. 2, 1998

[87] PCT Pub. No.: WO98/22337

PCT Pub. Date: May 28, 1998

[30] Foreign Application Priority Data

Nov. 11, 1996 [IT] Italy ................................. RM96A0793

[51] Int. Cl.[7] .................................................. B63H 25/46
[52] U.S. Cl. ............................................................ 114/151
[58] Field of Search .................................. 440/40, 41, 42, 440/43, 47, 38, 5; 114/151, 146

[56] References Cited

U.S. PATENT DOCUMENTS

| | | |
|---|---|---|
| 1,702,222 | 12/1929 | Paxton . |
| 2,884,889 | 5/1959 | Jorg et al. .................................. 440/40 |
| 4,056,073 | 11/1977 | Dashew et al. .......................... 114/151 |
| 4,265,192 | 5/1981 | Dunn . |
| 4,807,552 | 2/1989 | Fowler . |

FOREIGN PATENT DOCUMENTS 354164  8/1931  United Kingdom .

WO9321063  10/1993  WIPO .

OTHER PUBLICATIONS

NN.: "Omnithruster Eases Vessel Control," *Offshore* (Inc. The Oilman), vol. 37, No. 5, May 1997, Tulsa, U.S., pp. 388–392, XP002058685.

*Shipping World and Shipbuilder*, vol. 152, No. 3723, Dec. 17, 1964, London, England, p. 756 XP002058684, Kawasaki Jet Truster (Kawasaki Dockyard).

NN.: "Bow Jet Thrust System," *Motorship*, vol. 48, No. 569, Dec., 1967, London, England, p. 394 XP002058686.

*Primary Examiner*—S. Joseph Morano
*Assistant Examiner*—Patrick Craig Muldoon
*Attorney, Agent, or Firm*—Smith, Gambrell & Russell, LLP

[57] ABSTRACT

A hydraulic system for the control of boats, ships and crafts in general that comproses nozzles (1, 2) opposed and the end of the stem, having a Venturi tube throttling (8) or an internal diameter reduced by means of flanges (10), so as to be able to determine, following to the outlet of the fluid under pressure, the movement by reaction of the front part of the boat (N) and therefore to perform immediate leftward or rightward curvings according to the nozzle used, and/or corresponding nozzles (3, 4), placed nearby the stern and with similar background function, while the operating the hydraulic reaction of both nozzles placed on the same side determines the parallel movement on the whole craft, for moming alongside to quays or for performing other maneuvers.

12 Claims, 3 Drawing Sheets

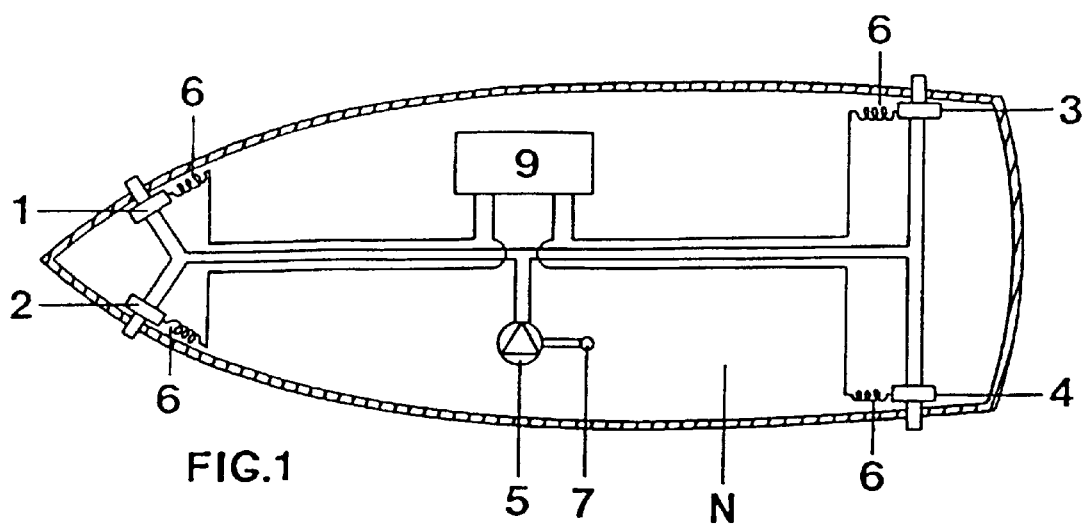
FIG.1
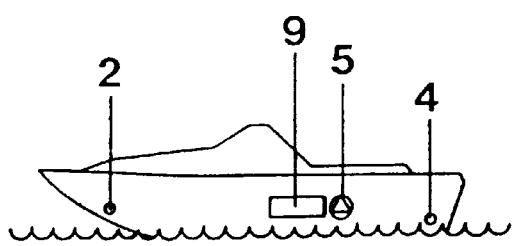
FIG.2
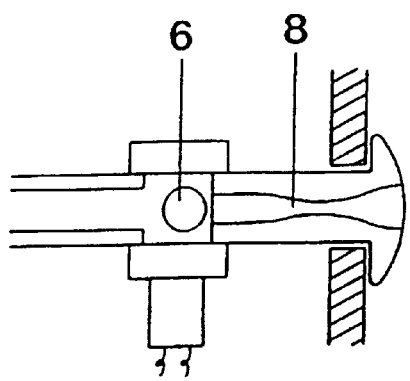
FIG.3
FIG. 4
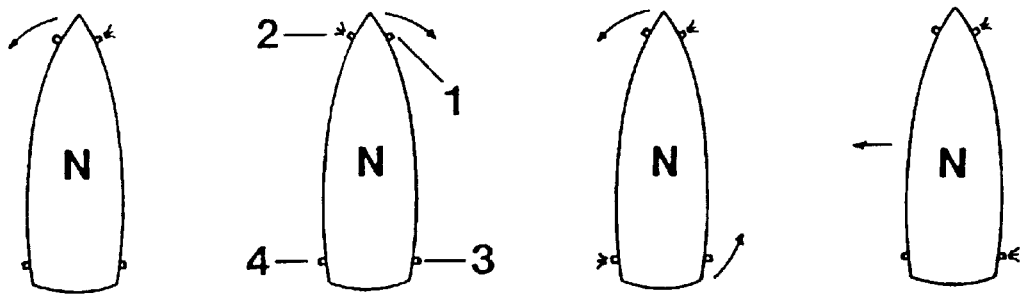

//6,158,371//

HYDRAULIC SYSTEM FOR MANEUVRING BOATS, SHIPS AND CRAFTS IN GENERAL

FIELD OF THE INVENTION

The present invention concerns a hydraulic system for the control of boats, ships and crafts in general, working on the principle of action and reaction.

BACKGROUND OF THE INVENTION

It is known that the systems used until now on ships and boats for facilitating lateral movements during maneuvers in small spaces or with side winds, are essentially based on maneuver propellers installer in fitting housings arranged below the vessel floating line.

Moreover, said systems are a great safety concern due to the presence of large openings below the floating line that complicate maintenance and hydrodynamic advancement; furthermore, past systems have the disadvantage of requiring expensive fitting onto the hulls of ships that use them, for e.g., the insertion of pass-through tubular structures of great diameter that may contain transversal propellers.

Furthermore, on some boats—like sailing boats or some motor-boats—which have small head wheels, such systems can not be applied.

It is the aim of the present invention to make easy the maneuvers of ships and boats of all kinds, making use of a system based on the principle of action and reaction, determined by a jet of a fluid generated by pumps housed in the hull and that comes out under pressure from suitable nozzles. The nozzles may be internally shaped like a venturi pipe or similar shape so as to obtain, in the outlet points of the fluid and due to fitting throttlings, a direct force in the opposite direction of the discharged fluid and proportional to the pressure and to the volume of pumped fluid.

Consequently, the present invention provides the presence of nozzles on opposed bulwarks at the end of the stem that will determine, due to the discharge of the fluid under pressure above the sea level, the reactive displacement of the head of the boat and therefore the possibility of immediately performing right or left turns, according to the employed nozzle.

In a similar way, rotations around the barycentre will be allowed with the help of corresponding nozzles arranged on opposed bulwarks near the stem; the hydraulic reaction operation of the two nozzles arranged on the same bulwark will determine the parallel motion of the entire craft for maneuvering along a warf or for performing a different maneuver.

The advantages of the system according to the present invention are evident.

The system according to the present invention will be described more in detail hereinbelow relating to the enclosed drawings, in which an embodiment is shown.

DESCRIPTION OF THE DRAWINGS

FIG. 1 shows a scheme of a hydraulic system for the control of boats, ships and crafts in general, installed onto a boat.

FIG. 2 shows a lateral view of a possible localization of the nozzles on a boat.

FIG. 3 shows in detail, the internal structure of an ejector nozzle.

In FIG. 4, the arrows show possible maneuvers of hulls provided with the system according to the present invention.

DETAILED DESCRIPTION OF THE PREFERRED EMBODIMENT

Figure 5:
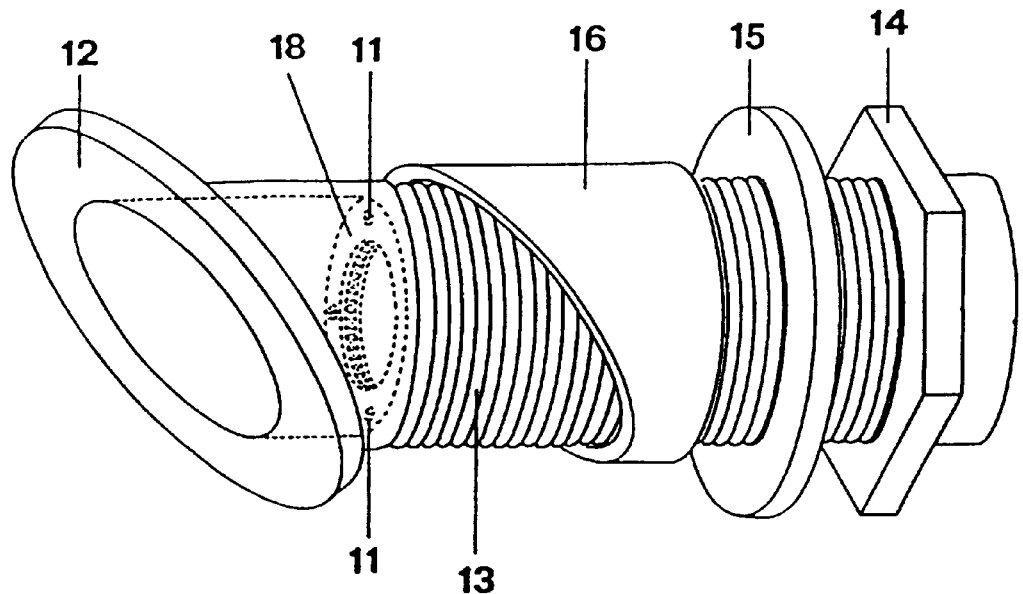
FIGS. 5 and 6 show, in a respective axonometric view and transversal section, a variant of an ejector nozzle with internal throttling.

The enclosed figures show a hydraulic system for the control of boats, ships and crafts in general, comprising two or more front nozzles 1, 2 and/or two or more back nozzles 3,4, with dimensions proportioned to those of the boat N and to the capacity of the pump(s) 5 housed in the hull and fixed to the bulwarks in determined points by means of pass-through holes. The flow to the nozzle(s) is controlled by means of valve(s) 6 operated with mechanical, hydraulic, or electrical systems, or by engines or other means.

The hydraulic system also comprises of one or more pump(s) 5 housed in the hull N, powered by the engine of the boat by means of electromagnetic pulleys, hydraulic or electric transmissions, an autonomous motor energy source of any kind, or by other means. The pump(s) 5, for supplying the thrust to the fluid under pressure, for example, water directly collected from the bottom of the boat through intake 7.

The hydraulic system further comprises an internal structure of said nozzles 1, 2, 3, 4, operated by electrovalve(s) 6 and having a discharge in the shape of a throttling venturi pipe 8, for increasing and adjusting the hydraulic thrust by means of the valve(s) 6. The systems operations are directed from a control board 9 which may be arranged on the bridge, for the localization of the electric switches or of the operating controls. The functioning of the hydraulic system for the control of boats, ships and crafts in general, according to the present invention, may be briefly described in the following way.

The engine of boat N operates a pump 5 by means of pulleys with an electromagnetic clutch. Said pump sucks water from the bottom of said boat N, by means of an intake 7 from the sea. Water is pushed through pipes to nozzles 1,2,3,4, which are individually chosen for the particular maneuver. The nozzles are arranged on the bulwarks and operated by electrovalve(s) 6;

when the electric switche(s) provided on the bridge are operated, an electrical signal is supplied to the pulley or clutch to start the pump and, at the same time, to activate the electrovalve(s) chosen for supplying the thrust through fluid ejectment at the desired point(s).

In a variant of the hydraulic system according to the present invention, the system provides the presence of one or more nozzles arranged backwards or frontwards to the boat or ship or craft, so as to exploit the thrust in all directions.

The system would also be useful in the case of breakdown of the main engines or other moving means, so as to obtain emergency movement. This use would be particularly applicable in sailing-boats or for pulling, at a low speed, fishing boats.

Figure 6:
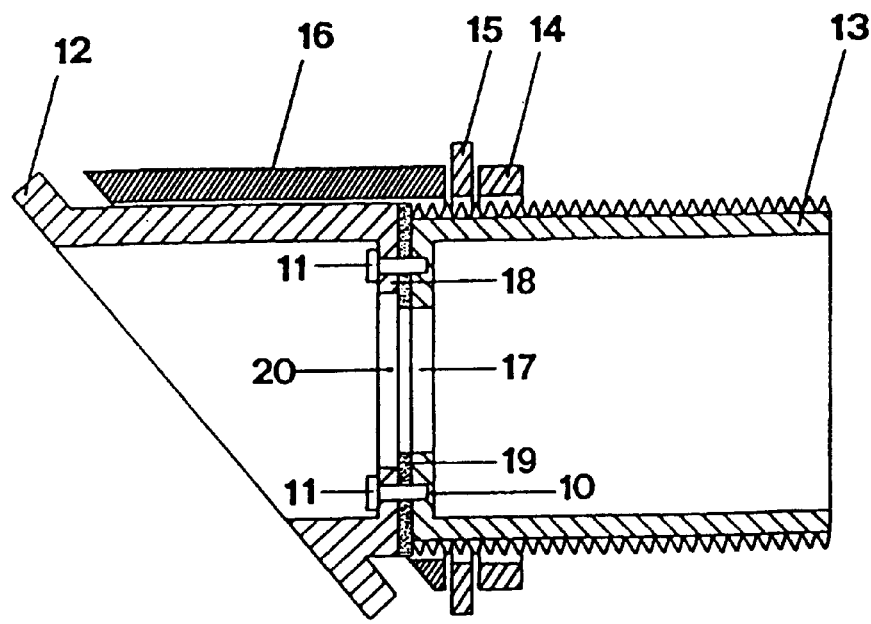

In the variant shown in FIGS. 5 and 6, the ejector nozzle consists of a plurality of elements assembled by means of screws 11 and a cylindric body externally threaded 13, with the end section reduced by an internal flange 10 with a central hole 17. The nozzle also has an external counter-flange 18, fastened to said body 13 by means of said screws 11 and with the interposition of a sealing gasket 19. The nozzle has a metal ring 12 that is shaped in one single piece with different inclinations that may be fitted to the different shapes of the bulwarks. By means of screws 11, the nozzle design places an external flange 18 in specular coupling with said internal flange 10 which has a central hole 20 of a diameter slightly greater than the one of said central hole 17. Flanges 10 and 18 are sized relative to each other so as not to hinder the outflow of the liquid jet that is accelerated and which, due to the principle Of action and reaction, determines a considerable direct thrust in the opposite sense, proportional to the liquid quantity pumped. Internal to the bulwalk and fitting around the metal ring 12 a spacer 16 that reorients the plane of the metal ring 12 to be normal to the washer 15 and the nut 14.

The installation of the above mentioned nozzle may be briefly described in the following way.

A pass-through hole having the same diameter as the external diameter of the cylindrical body 13, is made in the bulwark, after which, a metal ring 12 that has an inclination corresponding to that of the bulwark, is inserted into said hole.

The nozzle is secured to the bulwark by tightening the nut 14. The nozzle is connected to the hydraulic circuit, by making use of the remaining threaded part of the cylindric body 13.

For mounting the nozzle in small spaces, it is possible to separate the body 13 from the flange 18 by unscrewing screws 11, pre-connecting said body 13 to the hydraulic circuits, coupling the parts through the pass-through hole performed in the bulwark, rescrewing the screws 11 and tightening the nut 14.

Figure 7:
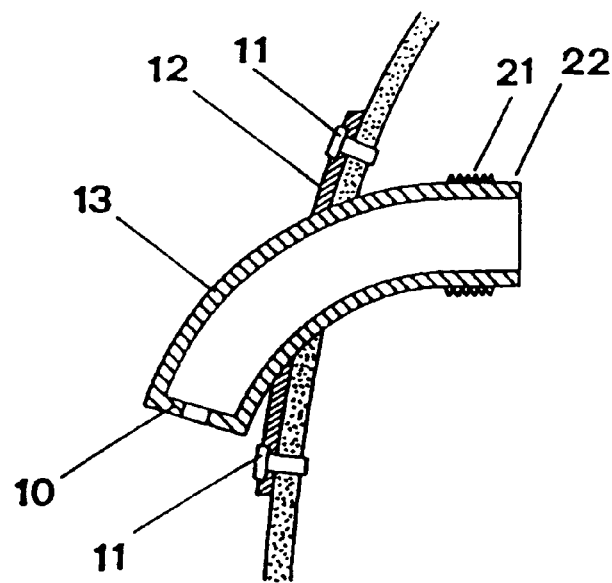
FIGS. 7 and 8 show a scheme of two variants of pressing or pulling ejector nozzles, which are particularly fitting on boats used for trawling.
Figure 8:
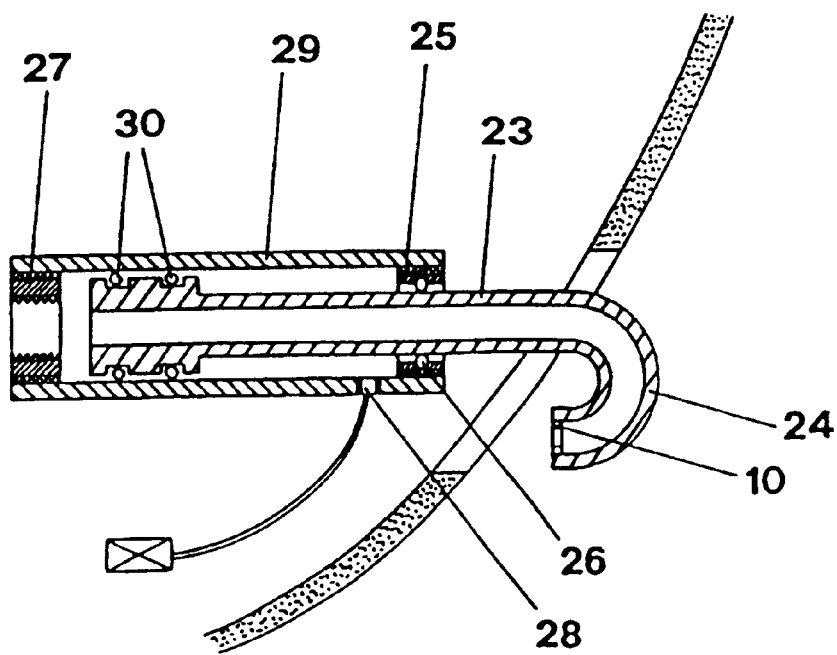

The variants of the system according to the present invention shown in FIGS. 7 and 8 are particularly suited for solving the problem of the slow motion, at different speeds, of boats and crafts used for trawling, wherein traction under action and reaction may be applied also to the stem of said crafts.

In the variant of FIG. 7, the body of the ejector 13 consists of a curved tubular conduit whose external end is internally reduced by said flange 10. The other end of the elector body 13 shows a threading 21, and a rubber supporting edge 22 for the connection to the hydraulic system. Said ejector forms a single body with external flange 12 adjustable inclinations resulting in perfect fitting to the external curving of the bulwark to which it is applied by means of screws 11. The fluid, pushed by the pump 5, due to the presence of said flange 10, flows out under a considerable pressure and with a direction nearly parallel to the bulwark of the boat. The force generated by the discharged fluid causes frontward motion, if it is turned towards the stern, or backward motion, if it is turned towards the stem.

The same function may be fulfilled, according to the present invention, by the variant shown in FIG. 8, consisting of a telescopic forward nozzle, formed by a pipe body 23 of different length. The outer end thereof has a curve 24 that redirects the high pressure fluid in the opposite direction at discharge from its direction when it first enters the pipe body 23. The nozzle is also provided, in the fluid outlet point, with a flange 10. At the inner part of said tube the seats for housing two o-ring sealing gaskets 30 are performed, so that the nozzle is free to slide inside a pipe 29, which is fastened to the hull. The ejector of FIG. 8 also has at an inner end, a perforated cap 25 with a sealing gasket 26 which seals cap 25 onto the pipe body 23 of the nozzle, while on the opposite side, a perforated and threaded cap 27 allows the connection to the hydraulic system.

Furthermore, at the end of said tube and nearby the outer sealing gasket, the pipe 29 contains a threaded hole 28 for fastening, by means of nipples, a small pressure pipe. When the fluid under pressure gets in through said cap 27, said nozzle 23 is first thrust by said fluid until it is stopped by cap 25. The pressurized fluid then flows out of said nozzle from its forward housing in the hull. It is then discharged through flange 10. The reaction effect of the pressurized water discharge exerts a reaction force that moves the boat.

When the nozzle has accomplished its task, it is again retracted into pipe 29, due to the intake of fluid under pressure through the threaded hole 28.

What is claimed is:

1. A hydraulic system for the control of a water vessel, comprising:

a pair of nozzles supported on the vessel so as to be above a water line when in operation;

a pump;

a piping system in fluid communication with said pair of nozzles and pump;

valves for controlling fluid flow with respect to said nozzles;

engagement means for engaging said pump with respect to a driver from a disengaged driver state; and central control means for activating said engaging means to place said pump into an engaged state with the driver and, at the same time, to ensure a corresponding opening of at least one of said valves;

wherein at least one of said nozzles includes a nozzle ejector which comprises:

a rotatable, curved tubular conduit for discharging fluid in a opposite direction of a desired motion of the boat;

a connector for connecting the internal end of said tubular conduit with the piping system; and an external flange that is formed of a flexible material that conforms to the shape of the vessel for sealing between the tubular conduit and the vessel and sealingly and rotatably supports the tubular conduit.

2. A hydraulic system for the control of a water vessel, comprising:

a pair of nozzles supported on the vessel so as to be above a water line when in operation;

a pump:

a piping system in fluid communication with said pair of nozzles and pump;

valves for controlling fluid flow with respect to said nozzles;

engagement means for engaging said pump with respect to a driver from a disengaged driver state;

central control means for activating said engaging means to place said pump into an engaged state with the driver and, at the same time, to ensure a corresponding opening of at least one of said valves, wherein at least one of said nozzles comprises:

an inner pipe in fluid communication with said piping system and through which fluid is ejected to cause motion of the vessel in a direction opposite to a direction of travel of the ejected fluid, said inner pipe having a flanged external end arranged at an angle which conforms to a slope angle of a side wall of the vessel which is to receive said at least one nozzle;

an outer pipe which is axially adjustable along said inner pipe, and includes means for compressing said flange against the vessel to secure said at least one nozzle in position; and wherein said outer pipe has an external end arranged obliquely with respect to a central axis of said at least one nozzle so as to conform to an angle of inclination of a surface of the vessel into which said external end comes in contact, and wherein said means for compressing includes a threaded member threaded on said inner pipe.

3. A hydraulic system for the control of a water vessel, comprising:

a pair of nozzles supported on the vessel so as to be above a water line when in operation;

a pump:

a piping system in fluid communication with said pair of nozzles and pump;

valves for controlling fluid flow with respect to said nozzles;

engagement means for engaging said pump with respect to a driver from a disengaged driver state; and central control means for activating said engaging means to place said pump into an engaged state with the driver and, at the same time, to ensure a corresponding opening of at least one of said valves;

wherein at least one of said nozzles comprises:

an inner pipe in fluid communication with said piping system and through which fluid is ejected to cause motion of the vessel in a direction opposite to a direction of travel of the ejected fluid, said inner pipe having a flanged external end arranged at an angle which conforms to a slope angle of a side wall of the vessel which is to receive said at least one nozzle;

an outer pipe which is axially adjustable alone said inner pipe, and includes means for compressing said flange against the vessel to secure said at least one nozzle in position; and wherein said inner pipe includes an external pipe section and an internal pipe section and means for releasably coupling said internal and external pipe sections, and said at least one nozzle includes a restricted area positioned in an area where said internal pipe section and external pipe section are coupled.

4. A hydraulic system for the control of a water vessel, comprising:

a pair of nozzles supported on the vessel so as to be above a water line when in operation;

a pump;

a piping system in fluid communication with said pair of nozzles and pump;

valves for controlling fluid flow with respect to said nozzles;

engagement means for engaging said pump with respect to a driver from a disengaged driver state; and central control means for activating said engaging means to place said pump into an engaged state with the driver and, at the same time, to ensure a corresponding opening of at least one of said valves;

wherein at least one of said nozzles includes a nozzle ejector in the shape of a venturi that reduces fluid flow area and then gradually expands the discharge flow area.

5. A hydraulic system for the control of a water vessel, comprising:

a pair of nozzles supported on the vessel so as to be above a water line when in operation;

a pump;

a piping system in fluid communication with said pair of nozzles and pump;

valves for controlling fluid flow with respect to said nozzles;

engagement means for engaging said pump with respect to a driver from a disengaged driver state; and central control means for activating said engaging means to place said pump into an engaged state with the driver and, at the same time, to ensure a corresponding opening of at least one of said valves;

said vessel having an arrangement of stern nozzles with a central fluid flow outlet axis extending in a direction perpendicular to the center line of the boat and an arrangement of stem nozzles in a direction that makes an acute angle with the center line of the boat.

6. A hydraulic system for the control of a water vessel, comprising;

a nozzle supported by the vessel;

a pump;

a piping system in fluid communication with said nozzle and pump;

a valve for controlling fluid flow with respect to said nozzle; and said nozzle including a fluid conduit, a reduced discharge component positioned in line with fluid passing through said conduit, an external flange connected with said conduit and arranged obliquely with respect to a central axis of said conduit to conform to an angle of incline of a side wall of the vessel to receive said nozzle, and a clamp assembly which includes an axial adjustable member having an oblique end which conforms to an incline of an inner contact surface of the side wall of the vessel, and locking means for placing said external flange and oblique end surface of said adjustable end member in a compression state with respect to the side wall of said vessel.

7. A hydraulic system as recited in claim 6, wherein said axial adjustable member includes a cylindrical body in a sliding relationship with respect to said conduit, and said conduit including a threaded section, and said locking means included a threaded ring threadably received by the threaded section of said conduit and positionable into contact with said cylindrical body.

8. A hydraulic system as recited in claim 7, wherein said conduit includes a first conduit section and a second conduit section and means for releasable engagement of said first and second conduit sections, with said first conduit section including said external flange and said second conduit including said threaded section.

9. A hydraulic system as recited in claim 6 wherein said conduit inclues a first section that includes said external flange and a second section, and a releasable coupling positioned so as to couple said first and second conduit sections.

10. A hydraulic system as recited in claim 9, wherein each of said first and second conduit sections includes an internal annular flange which defines a restricted flow region in said nozzle.

11. A hydraulic system as recited in claim 10 wherein said releasable coupling includes a connection member that extends into contact with the annular flange of each conduit section.

12. A hydraulic system as recited in claim 11 further comprising a seal member positioned between the internal annular flanges of said first and second conduit sections.

* * * * *